Aug. 12, 1952    J. F. LINDLY    2,606,691
COMBINATION SALT AND PEPPER SHAKER
Filed Oct. 15, 1948
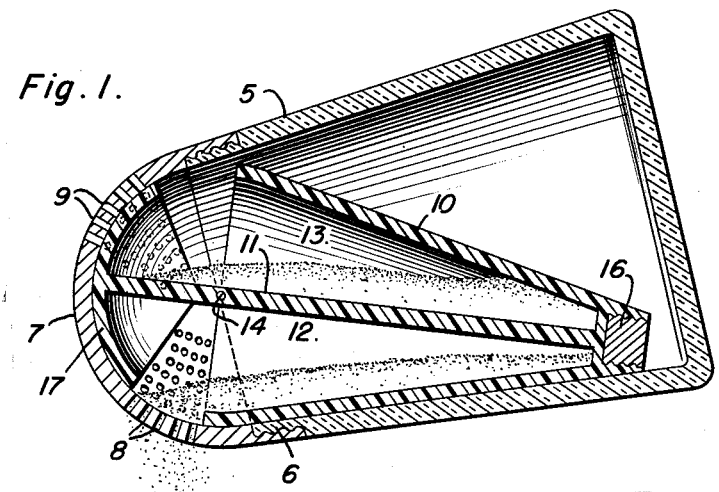
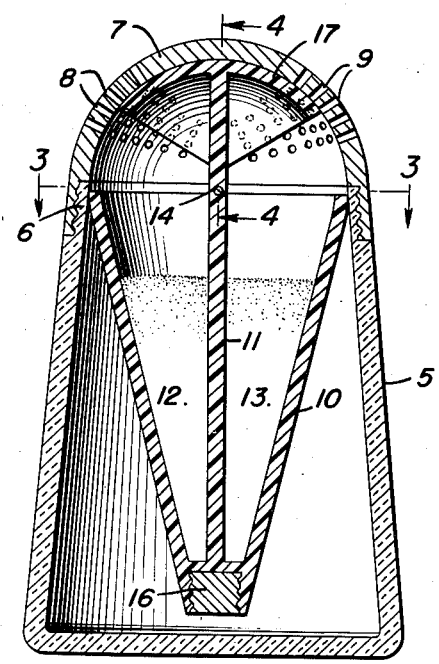
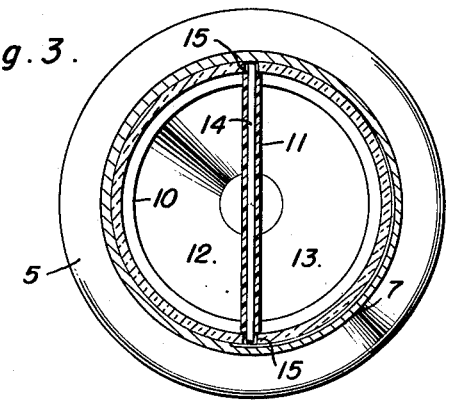
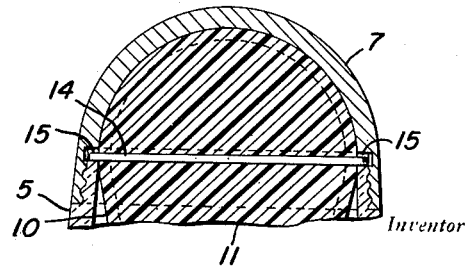
Inventor
James F. Lindly
By Clarence A. O'Brien
and Harvey B. Jacobson
Attorneys Patented Aug. 12, 1952

2,606,691

UNITED STATES PATENT OFFICE 2,606,691

COMBINATION SALT AND PEPPER SHAKER

James F. Lindly, Dahlen, N. Dak.

Application October 15, 1948, Serial No. 54,696

5 Claims. (Cl. 222—142.6)

This invention relates to a shaker for dispensing two different condiments, such as salt and pepper, and the primary object of the invention is to provide a simple and efficient device of this kind which may be readily taken apart for cleaning, and in which the supplies of condiments may be readily replenished.

A further object is to provide a device of the above kind which will automatically allow dispensation of one condiment when the device is tilted in either of two directions and will simultaneously prevent dispensation of the other condiment.

More particularly, the present invention contemplates the provision of a shaker of the above kind including an outer receptacle having a removable cap provided with two sets of perforations, an open top pendulum-like inner container pivotally suspended within the outer receptacle and divided by a central longitudinal partition into separate compartments adapted to receive different condiments, and a closure member rigid with said partition and movable across the inner surface of said cap so as to automatically open the set of perforations which is lowermost and to simultaneously close the other set of perforations when the shaker is tilted in either of two opposite directions.

The exact nature of the present invention, as well as other objects and features thereof, will become apparent from the following description when considered in connection with the accompanying drawings, in which:

Figure 1 is a central longitudinal sectional view of a condiment shaker constructed in accordance with the present invention, showing the shaker tilted in position to dispense a condiment from one compartment of the inner container.

Figure 2 is a view similar to Figure 1, showing the shaker in an upright position.

Figure 3 is a horizontal section taken on line 3—3 of Figure 2.

Figure 4 is a fragmentary vertical section taken on line 4—4 of Figure 2.

Referring in detail to the drawing, 5 indicates an outer upwardly tapered receptacle provided at the top with a neck 6 onto which is removably screwed a substantially hemispherical cap 7 having sets of perforations 8 and 9 in opposite side portions thereof. Disposed within the receptacle 5 is an inner substantially conical open-top container 10 divided by a central longitudinal partition 11 into two compartments 12 and 13 adapted to receive different condiments, such as salt and pepper. The partition 11 has a cross pin 14 whose ends project and are pivotally seated in dimetrically opposed notches 15 provided in the upper edge of the neck 6 to pivotally suspend the container 10 within the receptacle 5. The smaller lower end of container 10 is weighted, as by having a weight 16 molded therein, so that said container is adapted to swing as a pendulum. The top of container 10 is of an external diameter substantially the same as the internal diameter of the upper end of neck 6.

The partition 11 extends above the top of container 10 and has a segmento-spherical closure member 17 centrally fixed on its upper end in position to contact and move across the inner surface of cap 7 to open either set of perforations 8 or 9 and simultaneously close the other set of perforations when the shaker is tilted in one of two opposite directions, said closure member being moved by the inner container 10 as the latter gravitates to the lower side of the receptacle 5 as shown in Figure 1. Thus, the shaker may be tilted to selectively permit dispensation of either condiment desired while preventing dispensation of the other.

It will be noted that the ends of pin 14 are held in the notches 15 by cap 7, but that upward removal of the unit composed of parts 10, 11, 14 and 17 is permitted upon removal of said cap. Also, the supplies of condiments in the compartments 12 and 13 may be readily replenished upon removal of said cap.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

What is claimed as new is:

1. A condiment shaker comprising an outer receptacle provided at the top with a neck, a removable cap secured on said neck and having sets of perforations in opposite side portions thereof, an inner open top and downwardly tapered container disposed within and pivotally suspended at its larger end from the neck of said outer receptacle and having a longitudinal partition dividing the same into two compartments adapted to receive different condiments, said inner container being weighted at the bottom to swing as a pendulum, said partition extending above the tops of said outer receptacle and said inner container into the cap, and a closure member fixed on the upper end of said partition in position to contact and swing across the inner surface of said cap to open one set of perforations and simultaneously close the other set thereof when the shaker is tilted in either of two opposite directions, wherein the neck has diametrically opposed notches in its upper edge, in combination with a cross pin carried by said partition and having projecting ends removably seated and journaled in said notches, said cap engaging the ends of said cross pin to hold them in said notches.

2. A condiment shaker comprising an outer receptacle having a substantially frusto-conical contour and being provided with a neck, a removable cap secured on said neck and having sets of perforations in the opposite side portions thereof, an inner container being completely enclosed by said outer receptacle and cap and having a closed bottom and an open top and being pivotally mounted within said outer receptacle, said container being substantially conical in contour and being inverted relative to said outer receptacle, a longitudinal partition extending from the bottom of said inner container to above the top of the same and dividing said inner container into two compartments, a closure member secured to the top of said partition and being slidable against the inner surface of said cap upon pivotal movement of said inner container, and means on said inner container for gravitationally pivoting the same upon tilting of said outer receptacle.

3. The combination of claim 2 wherein said means comprises a weight embedded in the bottom of said inner container.

4. The combination of claim 2 wherein said closure member is complementary to the inner surface of said cap.

5. The combination of claim 2 wherein said closure member is complementary to the inner surface of said cap, said cap being substantially hemispherical, said closure member comprising a segmento-spherical portion and means for closing one set of said perforations by said member upon tilting of said receptacle.

JAMES F. LINDLY.

REFERENCES CITED

The following references are of record in the file of this patent:

UNITED STATES PATENTS

| Number | Name | Date |
| --- | --- | --- |
| 1,085,660 | Blum | Feb. 3, 1914 |
| 1,193,332 | Young | Aug. 1, 1916 |
| 1,965,148 | Massa | July 3, 1934 |
| 2,113,604 | Richter | Apr. 12, 1936 |
| 2,155,534 | Edwards | Apr. 25, 1939 |
| 2,156,554 | Vitek | May 2, 1939 |
| 2,185,576 | Tarantolo | Jan. 2, 1940 |
| 2,234,749 | Doucette | Mar. 11, 1941 |

FOREIGN PATENTS

| Number | Country | Date |
| --- | --- | --- |
| 257,205 | Great Britain | Aug. 26, 1926 |